(12) United States Patent
Renshaw et al.

(10) Patent No.: US 7,317,838 B2
(45) Date of Patent: Jan. 8, 2008

(54) COMPRESSION OF BI-LEVEL IMAGES WITH EXPLICIT REPRESENTATION OF INK CLUSTERS

(75) Inventors: Erin L. Renshaw, Kirkland, WA (US); Patrice Y. Simard, Bellevue, WA (US); Henrique S. Malvar, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/734,299

(22) Filed: Apr. 12, 2007

(65) Prior Publication Data

US 2007/0242888 A1 Oct. 18, 2007

Related U.S. Application Data

(62) Division of application No. 10/133,532, filed on Apr. 25, 2002, now Pat. No. 7,206,450.

(51) Int. Cl.
*G06K 9/36* (2006.01)
*G06K 9/46* (2006.01)

(52) U.S. Cl. ...................... 382/233; 382/244
(58) Field of Classification Search ............. 382/232, 382/233, 243, 244, 253; 358/426.13, 426.16
See application file for complete search history.

(56) References Cited

U.S. PATENT DOCUMENTS 6,256,415 B1 * 7/2001 Ratnakar .................... 382/232
6,477,280 B1 11/2002 Malvar
6,512,793 B1 1/2003 Maeda
6,876,773 B2 4/2005 Mizuno et al.

OTHER PUBLICATIONS

Microsoft Cabinet SDK, Microsoft Corporation, Updated Mar. 20, 1997, Last viewed Jun. 29, 2004, 1 page.
J.H. Witten, A. Moffat, and T.C. Bell, Managing Gigabytes: Compressing and Indexing Documents and Images, San Francisco, CA: Morgan Kaufmann, 1999, Chapter 6, pp. 263-311.
Adolf Knoll et al., "Compression of Bi-Level Images", National Library of Czech Republic, Prague, pp. 1-18, 2000.

* cited by examiner

*Primary Examiner*—Phuoc Tran
(74) *Attorney, Agent, or Firm*—Amin, Turocy & Calvin, LLP

(57) ABSTRACT

A system and method facilitating compression of bi-level images with explicit representation of ink clusters is provided. The present invention includes a cluster shape estimator that analyzes connected component information, extracts clusters and stores the cluster in a global dictionary, a page dictionary or a store of unclustered shapes. A bitmap estimation from clusters component determines dictionary positions for clusters stored in the global dictionary which are then encoded. A cluster position estimator determines page positions of clusters of the global dictionary and/or the page dictionary that are then encoded. Further, the global dictionary, the page dictionary and the store of unclustered shapes are also encoded.

9 Claims, 14 Drawing Sheets

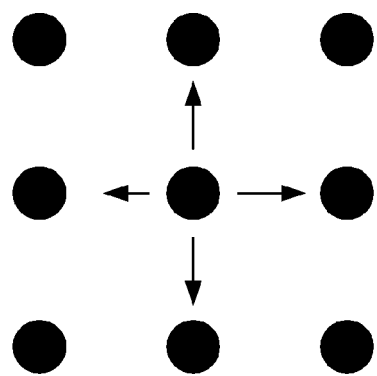
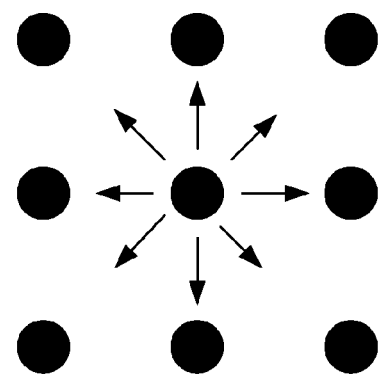
200 ↗                300 ↗
FIG. 2                FIG. 3

| INDEX | X SIZE | Y SIZE | |
|-------|--------|--------|--|
| 0 | 10 | 20 | |
| 1 | 12 | 15 | |
| 2 | 8 | 15 | |
| 3 | 11 | 20 | |
| 4 | 4 | 11 | |

FIG. 5

COMPRESSION OF BI-LEVEL IMAGES WITH EXPLICIT REPRESENTATION OF INK CLUSTERS

CROSS-REFERENCE TO RELATED APPLICATIONS

This application is a divisional of U.S. patent application Ser. No. 10/133,532, filed Apr. 25, 2002, now U.S. Pat. No. 7,206,450, entitled COMPRESSION OF BI-LEVEL IMAGES WITH EXPLICIT REPRESENTATION OF INK CLUSTERS, the entirety of which is incorporated herein by reference.

TECHNICAL FIELD

The present invention relates generally to digital picture processing, and more particularly to a system and method facilitating compression of bi-level images with explicit representation of ink clusters.

BACKGROUND OF THE INVENTION

The amount of information available via computers has dramatically increased with the wide spread proliferation of computer networks, the Internet and digital storage means. With such increased amount of information has come the need to transmit information quickly and to store the information efficiently. Data compression is a technology that facilitates the effective transmitting and storing of information Data compression reduces an amount of space necessary to represent information, and can be used for many information types. The demand for compression of digital information, including images, text, audio and video has been ever increasing. Typically, data compression is used with standard computer systems; however, other technologies make use of data compression, such as but not limited to digital and satellite television as well as cellular/digital phones.

As the demand for handling, transmitting and processing large amounts of information increases, the demand for compression of such data increases as well. Although storage device capacity has increased significantly, the demand for information has outpaced capacity advancements. For example, an uncompressed digital picture can require 5 megabytes of space whereas the same picture can be compressed without loss and require only 2.5 megabytes of space. Thus, data compression facilitates transferring larger amounts of information. Even with the increase of transmission rates, such as broadband, DSL, cable modem Internet and the like, transmission limits are easily reached with uncompressed information. For example, transmission of an uncompressed image over a DSL line can take ten minutes. However, the same image can be transmitted in about one minute when compressed thus providing a ten-fold gain in data throughput.

In general, there are two types of compression, lossless and lossy. Lossless compression allows exact original data to be recovered after compression, while lossy compression allows for data recovered after compression to differ from the original data. A tradeoff exists between the two compression modes in that lossy compression provides for a better compression ratio than lossless compression because some degree of data integrity compromise is tolerated. Lossless compression may be used, for example, when compressing critical text, because failure to reconstruct exactly the data can dramatically affect quality and readability of the text. Lossy compression can be used with pictures or non-critical text where a certain amount of distortion or noise is either acceptable or imperceptible to human senses.

Bi-level images are quite common in digital document processing, because they offer the potential for a compact representation of black-and-white documents containing texts and drawings. In such images, their picture elements (pixels) can be seen as coming from a binary source (e.g., white="0" and black="1"). Since they usually contain a lot of white space and repeated ink patterns, one basic approach to efficiently encode such images is to scan them in raster order, e.g., from top to bottom and left to right, and encode each pixel via adaptive arithmetic coding (AC), whose state (or probability table) is controlled by a context formed by the values of the pixels in a small template enclosing previously encoded pixels. That idea is the basis of most modern bi-level image compression systems.

Facsimile images are usually transmitted using the old CCITT standards T.4 and T.6, which are usually referred to as Group 3 and Group 4 respectively. G3 usually encodes images with a modified Huffman (MH) code (i.e., Huffman coding on runs of black or white pixels), and G4 uses "modified modified read" (MMR) coding. MH and MMR are not as efficient as context-adaptive AC, but are simpler to implement. Over time, G3 and G4 evolved to include encoding via JBIG (joint bi-level image group, also known as recommendation T.82). JBIG uses the context-adaptive AC, with adaptive templates and the efficient QM binary arithmetic encoder. The JBIG-2 standard extends JBIG by including pattern matching for text and halftone data, as well as soft pattern matching (SPM) for lossy encoding. The JB2 encoder is also based on SPM, but uses the Z-coder for binary encoding. JBIG, JBIG-2 and JB2 can provide a significant improvement in compression performance over G4.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a bi-level encoding system that extends current bi-level coding technology by making the prior assumption that a bitmap corresponds to a scanned document, which is likely to contain significant amounts of text. A scanned document can include bitmap patterns for character(s) corresponding to cluster(s) of black pixels. For purposes of discussion it is assumed that the background of the document is substantially white and the text is substantially black. However, any suitable bi-level color presentation for employment in connection with the present invention is intended to fall within the scope of the appended claims.

The bi-level encoding system scans a bitmap (e.g., from left to right and from top to bottom). The first time a cluster of ink is found, it is added to a dictionary of clusters. Then, instead of encoding the pixels for that cluster, a pointer P to the dictionary and the {X,Y} positional coordinates to where the cluster appears on the page is encoded. Next time the same cluster or a cluster that is close enough is found in the bitmap, we encode again not the pixels, but just the {P,X,Y} coordinates. If the cluster contains enough pixels, it is more efficient to encode the {P,X,Y} coordinates than to encode the pixels with a lossless encoder such as the bi-level codec (BLC), described in copending U.S. patent application entitled ADAPTIVE ENCODING AND DECODING OF BI-LEVEL IMAGES, having Ser. No. 11/297,629. The compression gain is higher for multi-page documents, because the cluster dictionary can be shared among all pages, so the overhead of encoding the dictionary itself becomes negligible.

The bi-level coding system can operate in lossless mode or lossy mode. In lossless mode, if a cluster in the bitmap is within a first threshold amount of a cluster in the dictionary, the {P,X,Y} data is sent as well as a "clustering residual"—the small difference(s) between the actual cluster and that in the dictionary. The clustering residual can be encoded using a lossless bi-level encoder. In lossy mode, if a cluster in the bitmap is within a second threshold amount of a cluster in the dictionary, the triplet {P,X,Y} is encoded; however, the clustering residual is not encoded.

The bi-level encoding system of the present invention can result in files that are, for example, significantly smaller than those generated by conventional scanners (e.g., CCITT G4). Thus, the bi-level encoding system can have significant impact on document transmittal and/or storage application(s), for example, digital libraries and digital document databases.

In accordance with an aspect of the present invention, the bi-level encoding system can include a cluster shape estimator, a bitmap estimation from clusters component, a cluster position estimator, a first encoder, a second encoder, a third encoder, and a fourth encoder. The cluster shape estimator analyzes connected component information (e.g., color, horizontal size, vertical size, horizontal position and/or vertical position) associated with a bitmap. The cluster shape estimator extracts clusters and stores them into at least one of a global dictionary of shapes, a page dictionary of shapes and a store of unclustered shapes.

In lossy mode, the cluster shape estimator can determine whether a cluster is within the second threshold amount of a cluster in the global dictionary. In one example, if the cluster is within the second threshold amount, the presence of the cluster on the page is noted. In another example, if the cluster is within the second threshold amount, the present of the cluster on the page is noted and the cluster stored in the global dictionary is modified based, at least in part, upon the cluster. For example, the cluster shape estimator can perform a weighted average of the cluster stored in the global dictionary and the cluster resulting in a modified cluster stored in the global dictionary. This can result in clearer text in a decoded bitmap when compared with the original bitmap. In yet another example, the first threshold (e.g., employed with regard to lossless mode) and the second threshold (e.g., employed with regard to lossy mode) have about the same value.

The global dictionary of shapes includes global clusters. Global clusters are clusters that occur more than once on the current bitmap (e.g., page) and/or were previously processed as part of the same document.

The page dictionary of shapes comprises page-level cluster(s)—cluster(s) that were found once on the current bitmap (e.g., page). For example, once the cluster shape estimator has substantially completed analysis of the current bitmap (e.g., page), a portion of the page dictionary of shapes comprising cluster(s) which were found only once on the current bitmap (e.g., page) can be sent (e.g., included in an encoded file). The indices (e.g., pointers) into the page dictionary do not have to be encoded because the page dictionary is ordered by cluster appearance on the page and page-level clusters, by definition, only occur once on the page.

The page dictionary of shapes can store clusters which occurred only once of previous bitmaps (e.g., pages), such that if a second occurrence of a substantially similar cluster is found on a later bitmap, the cluster can be stored in the global dictionary and removed from the page dictionary. The store of unclustered shapes stores connected component(s) that are either too small (e.g., smaller than a third threshold) or large (e.g., larger than a fourth threshold) to be text characters and therefore do not cluster well.

The bitmap estimation from clusters component determines dictionary positions for clusters stored in the global dictionary. The bitmap estimation from clusters component can utilize information (e.g., pointers) from the cluster shape estimator. The pointers are then encoded by the second encoder. Because the clusters have been sorted by position on the page, the indices (e.g. pointers) tend to form a text string-like order and, in one example, the second encoder can employ a compression algorithm suitable for text strings (e.g., LZX encoding).

In lossless mode, the bitmap estimation from clusters component can determine clustering residual(s). The bitmap estimation from clusters component can provide the information to the fourth encoder, to be encoded with the store of unclustered shapes (e.g., utilizing lossless bi-level encoding).

The cluster position estimator determines page positions of clusters of the global dictionary and/or the page dictionary utilizing the connected component information. Thus, for a cluster in the global dictionary and/or the page dictionary, its position on a page is determined utilizing the connected component information and the properties from a dictionary entry from either the global dictionary or the page dictionary. The page positions are then encoded by the first encoder.

In one example, the horizontal (x-direction) gap between clusters on a line is encoded since clusters to be regularly spaced, particularly within words. Additionally, for a line, an average horizontal gap can be calculated and encoded, with gap information thereafter being based on the difference between the average horizontal gap and the actual horizontal gap.

In another example, an average vertical (y-direction) value is calculated. The average vertical value for a line is encoded and thereafter for a cluster, the difference between the cluster's vertical value and the average vertical value is encoded. The bottom edge of the cluster's bounding box can be utilized as more letters in the Roman alphabet are aligned along the bottom edge than the top. As a result, the difference between a given cluster and the average tends to be small. Since the first encoder encodes on a line-by-line basis, the first horizontal value (x direction) and the average Y-value per line can be encoded.

The first encoder encodes page positions received from the cluster position estimator. For example, the first encoder can utilize bit-plane encoding. The second encoder encodes the dictionary positions received from the bitmap estimation from clusters component (e.g. LZX encoding).

The third encoder encodes the bitmap patterns in the page dictionary and/or the global dictionary and can utilize lossless bi-level bitmap encoding. The fourth encoder encodes the store of unclustered shapes and can utilize lossless bi-level bitmap encoding.

There has been an increased emphasis placed on the "paperless office" which typically means converting documents from paper to electronic form. Converted documents utilizing conventional technology, while enabling a user to scan, store and/or manipulate electronic documents, has resulting in large files. For example, with many scanners, it is easy to generate 1 megabyte of data for 20 scanned pages or so. It becomes difficult for the user to send scanned documents via e-mail for example, where the resulting large files can be a problem. However, a scanner utilizing the system and/or method of the present invention can reduce the storage requirement, for example, to as little as 1 megabyte per 200 scanned pages, so that a 50-page legal document, for example, would produce a ".blc" file of just 250 kilobytes, which can be quickly transmitted via e-mail.

Further, on a clean document, the gain of the system and/or method of the present invention over the common G4 format can be, for example, a factor of ten. On noisy documents, the compression gain over G4 can be a factor of five, or a factor of three in the limit of a very short document (a single page).

Another aspect of the present invention provides for the bi-level encoding system to further include a clustering system and/or an activity detection system.

The clustering system identifies information associated with a plurality of clusters (e.g., connected components). For example, the information can include width (e.g., x size), height (e.g., y size), color, horizontal position (e.g., absolute and/or relative) and/or vertical position (e.g. absolute and/or relative) of the plurality of clusters (e.g., connected components).

The activity detection system receives a bi-level image input. For example, bi-level image input can be a binary mask received from a mask separator component (not shown) or a scanned image (e.g., from a document scanner and/or a facsimile machine). The activity detection system analyzes the bi-level image for dithering/half toning and/or noise. The activity detection system provides a bi-level image output based on the bi-level image input; however, with reduced dithering/half toning and/or noise.

Bi-level image(s) based on document image(s) having dithering/half toning typically have a significant quantity of connected component(s) in and/or intersecting the region. Additionally, bi-level image(s) having noise typically have few connected component(s) in and/or intersecting the region. Thus, by determining the quantity of connected component(s) in and/or intersecting the region, the activity detection system can detect areas in which dithering/half toning and/or noise is likely present.

In addition to detecting dithering as discussed above, the activity detection system can further be adapted to detect noise in the bi-level image input. "Noise" refers to extraneous information (e.g. mark(s)) deletion of which will not substantially compromise integrity of the bi-level image. Removal of noise in the bi-level image input can lead to improved data compression resulting from a smoother image. A region of a bi-level image having noise would typically exhibit relatively little connectivity. For example, a region comprising solely a connected stray mark on a white background would have one connected component.

Yet another aspect of the present invention provides for a selectable bi-level encoding system having a bi-level encoding system, a lossless bi-level encoder and a selection component.

The lossless bi-level encoder can employ lossless bi-level encoding technique(s). The selection component allows for a selection between lossless bi-level encoding, utilizing the lossless bi-level encoder, and the bi-level encoding system (e.g. employing clusters (lossless or lossy)). Selection can be based, for example, upon a user preference and/or by a clustering system within the bi-level encoding system.

Another aspect of the present invention provides for a bi-level decoding system having a first decoder, a second decoder, a third decoder, a fourth decoder, a cluster generator and a combiner.

The first decoder decodes at least part of a bit stream input (e.g., produced by a corresponding encoder) and provides page position(s) of cluster(s). The second decoder decodes at least part of a bit stream input (e.g., produced by a corresponding encoder) and provides decoded dictionary positions. The third decoder decodes at least part of a bit stream input (e.g., produced by a corresponding encoder) and provides a decoded global dictionary of shapes and/or a decoded page dictionary of shapes. The fourth decoder decodes at least part of a bit stream input (e.g. produced by a corresponding encoder) and provides a store of unclustered shapes.

The cluster generator generates clusters based, at least in part, upon the page positions, dictionary positions and at least one of the global dictionary and page dictionary. The combiner provides a bi-level output based, at least in part, upon the clusters generated by the cluster generator and/or the store of unclustered shape(s).

Another aspect of the present invention provides for the bi-level encoding system to be employed in a vast array of document image applications, including, but not limited to, tablet person computers, segmented layered image systems, photocopiers, document scanners, optical character recognition systems, personal digital assistants, fax machines, digital cameras, digital video cameras and/or video games.

Other aspects of the present invention provide methods for performing bi-level encoding, cluster analysis and bi-level decoding. Further provided are a computer readable medium having computer usable instructions for a system for bi-level encoding and a computer readable medium having computer usable instructions for a system for bi-level decoding. Also provided is a data packet adapted to be transmitted between two or more computer components that facilitates bi-level encoding comprising a first data field comprising encoded page positions, a second data field comprising encoded dictionary positions, a third data field comprising at least one of an encoded global dictionary and an encoded page dictionary; and, a fourth data field comprising encoded store of unclustered shapes.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 2 is a diagram illustrating 4-connectivity property.

FIG. 3 is a diagram illustrating 8-connectivity property.

FIG. 5 is an exemplary global dictionary data structure in accordance with an aspect of the present invention.

DETAILED DESCRIPTION OF THE INVENTION

Figure 1:
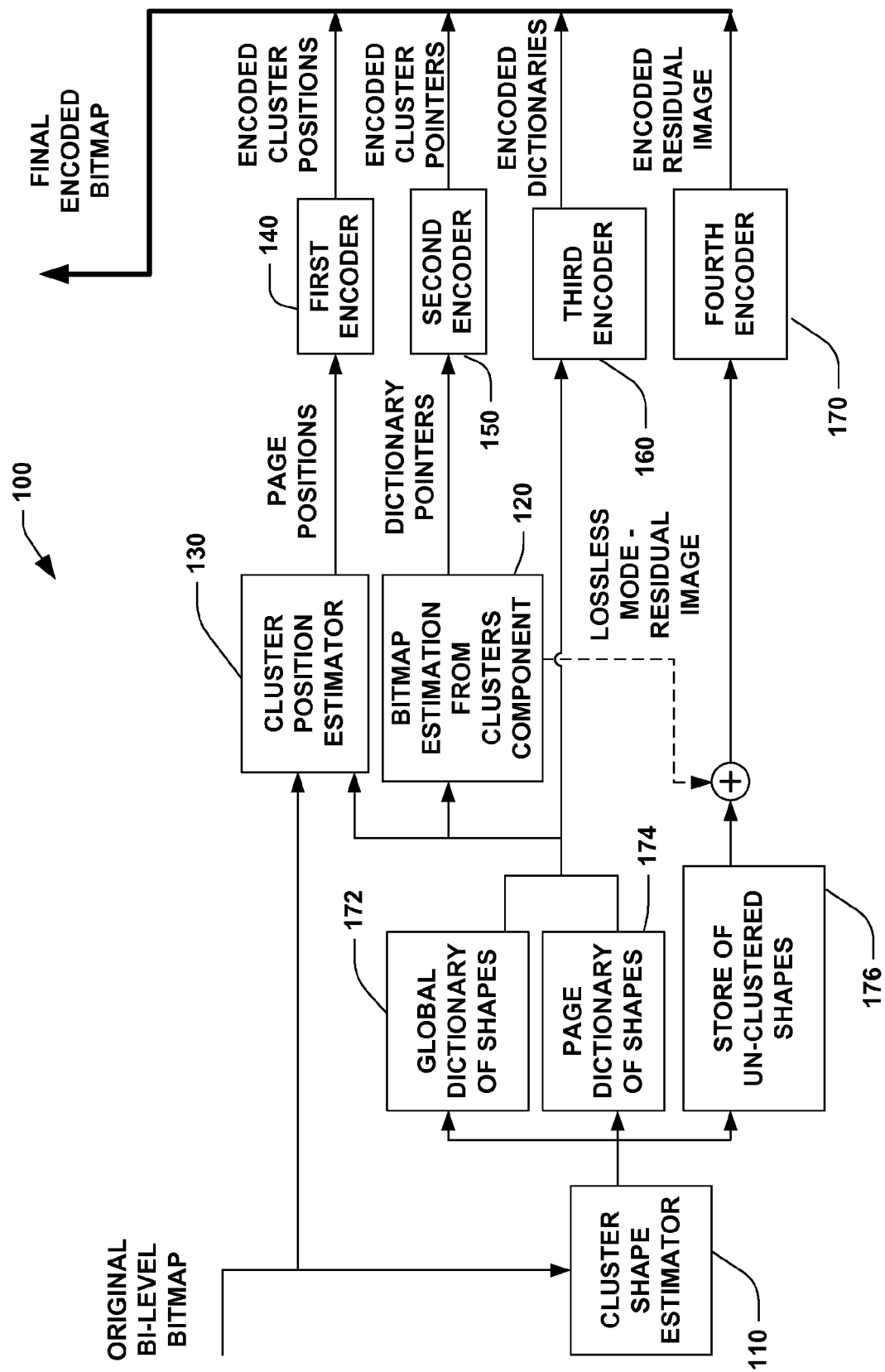
FIG. 1 is a block diagram of a bi-level encoding system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

Referring to FIG. 1, a bi-level encoding system 100 in accordance with an aspect of the present invention is illustrated. The bi-level encoding system 100 includes a cluster shape estimator 110, a bitmap estimation from clusters component 120, a cluster position estimator 130, a first encoder 140, a second encoder 150, a third encoder 160 and a fourth encoder 170.

The bi-level encoding system 100 extends current bi-level coding technology by making the prior assumption that a bitmap corresponds to a scanned document, which is likely to contain significant amounts of text. A scanned document can include bitmap patterns for character(s) corresponding to cluster(s) of black pixels. For purposes of discussion it is assumed that the background of the document is substantially white and the text is substantially black. However, any suitable bi-level color presentation for employment in connection with the present invention is intended to fall within the scope of the appended claims.

The bi-level encoding system 100 scans a bitmap (e.g. from left to right and from top to bottom). The first time a cluster of ink is found, it is added to a dictionary of clusters. Then, instead of encoding the pixels for that cluster, a pointer P to the dictionary and the {X,Y} positional coordinates to where the cluster appears on the page is encoded. Next time the same cluster or a cluster that is close enough is found in the bitmap, we encode again not the pixels, but just the {P,X,Y} coordinates. If the cluster contains enough pixels, it is more efficient to encode the {P,X,Y} coordinates than to encode the pixels with the lossless BLC. The compression gain is higher for multi-page documents, because the cluster dictionary can be shared among all pages, so the overhead of encoding the dictionary itself becomes negligible.

The bi-level coding system 100 can operate in lossless mode or lossy mode. In lossless mode, if a cluster in the bitmap is within a first threshold amount of a cluster in the dictionary, the {P,X,Y} data is sent as well as a "clustering residual"—the small difference(s) between the actual cluster and that in the dictionary. The clustering residual can be encoded using a lossless bi-level encoder. In lossy mode, if a cluster in the bitmap is within a second threshold amount of a cluster in the dictionary, the triplet {P,X,Y} is encoded; however, the clustering residual is not encoded.

The bi-level encoding system 100 of the present invention can result in files that are, for example, significantly smaller than those generated by conventional scanners (e.g., CCITT G4). Thus, the bi-level encoding system 100 can have significant impact on document transmittal and/or storage application(s), for example, digital libraries and digital document databases.

The cluster shape estimator 110 analyzes connected component information associated with a bitmap. For example, the connected component information can include color, horizontal size, vertical size, horizontal position and/or vertical position of the connected components. The cluster shape estimator 110 extracts clusters and stores them into at least one of a global dictionary of shapes 172, a page dictionary of shapes 174 and a store of unclustered shapes 176.

Referring briefly to FIG. 2, a diagram 200 depicting the 4-connectivity property is illustrated. The 4-connectivity property only identifies connected pixels in four primary compass directions. FIG. 2 illustrates the 4-connectivity property by showing a pixel surrounded by 4 pixels in the four primary compass directions. Turning next to FIG. 3, a diagram 300 depicting the 8-connectivity property is illustrated. FIG. 3 illustrates the 8-connectivity property by showing a pixel surrounded by 8 pixels in the eight principal directions. Connected components can include text as well as non-textual marks. It is to be appreciated that the systems and methods of the present invention can employ connected components having any suitable degree of connectivity and is not limited to connected components of 4-connectivity or 8-connectivity.

Figure 4:
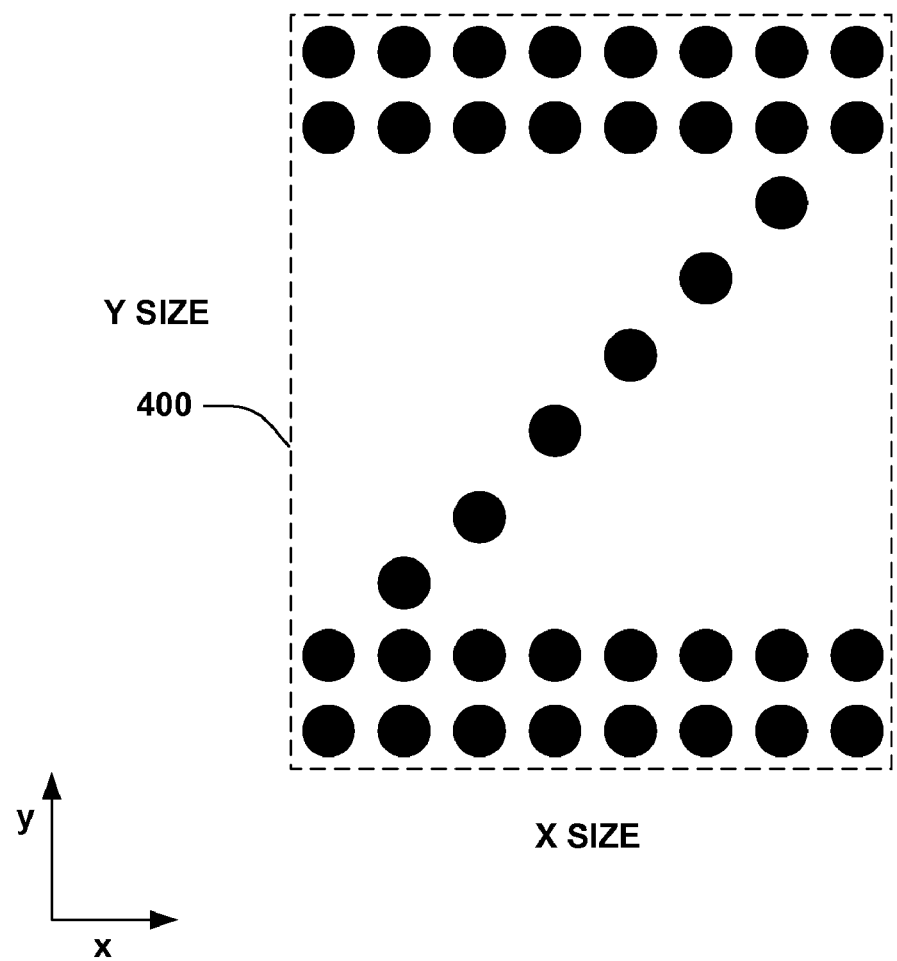
FIG. 4 is an exemplary connected component bounding box in accordance with an aspect of the present invention.

Turning briefly to FIG. 4, an exemplary connected component bounding box 400 in accordance with an aspect of the present invention is illustrated. The bounding box 400 generally comprises a rectangle encompassing a connected component having an x size (width) and a y size (height).

Referring back to FIG. 1, in lossy mode, the cluster shape estimator 110 can determine whether a cluster shape is within the second threshold amount of a cluster in the global dictionary 172. In an exemplary implementation, shape proximity is determined by aligning the candidate shape with the dictionary shape, and then counting the fraction of pixels in the candidate shape whose value (black or white) differ from the pixels in the dictionary shape. In one example, if the cluster is within the second threshold amount, the presence of the cluster on the page is noted. In another example, if the cluster is within the second threshold amount, the present of the cluster on the page is noted and the cluster stored in the global dictionary 172 is modified based, at least in part, upon the cluster. For example, the cluster shape estimator 110 can perform a weighted average of the cluster stored in the global dictionary 172 and the cluster resulting in a modified cluster stored in the global dictionary 172. This can result in clearer text in a decoded bitmap when compared with the original bitmap.

The global dictionary of shapes 172 includes global clusters. Global clusters are clusters that occur more than once on the current bitmap (e.g., page) and/or were previously processed as part of the same document. Referring briefly to FIG. 5, an exemplary global dictionary data structure 500 in accordance with an aspect of the present invention is illustrated. The global dictionary data structure 500 has a first field 510 storing an index into the data structure 500, a second field 520 storing a width (e.g., x size), a third field 530 storing a height (e.g. y size) and a fourth field 540 storing a bitmap of the global cluster. For example, the x size can be the maximum width of the connected component and the y size can be the maximum height of the connected component. The data structure 500 can comprise a plurality of global cluster entries 550.

The data structure 500 is merely exemplary and it is to be appreciated that numerous other structures are contemplated that provide for organizing and/or storing a plurality of data types conducive to facilitating bi-level encoding in connection with the subject invention. Any such data structure suitable for employment in connection with the present invention is intended to fall within the scope of the appended claims. Such data structures can be stored in computer readable media including, but not limited to, memories, disks and carrier waves.

Referring back to FIG. 1, the page dictionary of shapes 174 comprises page-level cluster(s)-cluster(s) that were found once on the current bitmap (e.g., page). For example, once the cluster shape estimator 110 has substantially completed analysis of the current bitmap (e.g., page), a portion of the page dictionary of shapes 174 comprising cluster(s) which were found only once on the current bitmap (e.g., page) can be sent (e.g., included in an encoded file). The indices (e.g., pointers) into the page dictionary 174 do not have to be encoded because the page dictionary 174 is ordered by cluster appearance on the page and page-level clusters, by definition, only occur once on the page.

In one example, each page has its own page dictionary 174 which is encoded after a page has been processed. Accordingly, entries in a previous page dictionary 174 are never removed. Once a page has been processed, its page dictionary 174 is encoded and can never be modified.

The page dictionary of shapes 174 can store clusters which occurred only once of previous bitmaps (e.g., pages), such that if a second occurrence of a substantially similar cluster is found on a later bitmap, the cluster can be stored in the global dictionary 172 and removed from the page dictionary 174. The store of unclustered shapes 176 stores connected component(s) that are either too small (e.g., smaller than a third threshold) or large (e.g., larger than a fourth threshold) to be text characters and therefore do not cluster well.

Thus, the cluster shape estimator 110 extracts clusters and stores the clusters into at least one of the global dictionary of shapes 172, the page dictionary of shapes 174 and the store of unclustered shapes 176. The cluster shape estimator 110 can provide information (e.g., pointers into the global dictionary of shapes 172) to the bitmap estimation from clusters component 120.

The bitmap estimation from clusters component 120 determines dictionary pointers for clusters stored in the global dictionary. The bitmap estimation from clusters component 120 can utilize information (e.g., pointers) from the cluster shape estimator 110, in addition to cluster dictionary information. The pointers are then encoded by the second encoder 150. Because the clusters tend to capture the characters of text, the indices (e.g., pointers) tend to form a string-like order mapping closely to the text strings in the document. Thus, in one example, the second encoder 150 can employ a compression algorithm suitable for text strings. For example, the second encoder 150 can utilize LZX encoding.

In lossless mode, the bitmap estimation from clusters component 120 can determine clustering residual(s). The bitmap estimation from clusters component 120 can provide the information to the fourth encoder 170, to be encoded with the store of unclustered shapes 176 (e.g., utilizing lossless bi-level encoding).

The cluster position estimator 130 determines page positions of clusters of the global dictionary 172 and/or the page dictionary 174 utilizing the connected component information. Thus, for a cluster in the global dictionary 172 and/or the page dictionary 174, its position on a page is determined utilizing the connected component information and the properties from a dictionary entry from either the global dictionary 172 or the page dictionary 174. The page positions are then encoded by the first encoder 140. Because the clusters have been sorted by position on the page, the page positions tend to increase monotonically. So, in an exemplary implementation the first encoder 140 encodes positions by computing position differences {e.g. Xcurrent−Xprevious and Ycurrent−Yprevious}, and encoding such differences with an entropy encoder suitable for integers that are more likely to assume small values, such as a bit-plane encoder as described in copending U.S. patent application entitled Lossless Adaptive Encoding of Finite Alphabet Data, having Ser. No. 11/355,875.

In one example, the horizontal (x-direction) gap between clusters on a line is encoded since clusters to be regularly spaced, particularly within words. Additionally, for a line, an average horizontal gap can be calculated and encoded, with gap information thereafter being based on the difference between the average horizontal gap and the actual horizontal gap.

In another example, an average vertical (y-direction) value is calculated. The average vertical value for a line is encoded and thereafter for a cluster, the difference between the cluster's vertical value and the average vertical value is encoded. The bottom edge of the cluster's bounding box can be utilized as more letters in the Roman alphabet are aligned along the bottom edge than the top. As a result, the difference between a given cluster and the average tends to be small. Since the first encoder 140 encodes on a line-by-line basis, the first horizontal value (x direction) and the average Y-value per line can be encoded.

The first encoder 140 encodes page positions received from the cluster position estimator 130. For example, the first encoder 140 can utilize bit-plane encoding. The second encoder 150 encodes the dictionary positions received from the bitmap estimation from clusters component 120 (e.g., LZX encoding).

The third encoder 160 encodes the bitmap patterns in the page dictionary and/or the global dictionary and can utilize lossless bi-level bitmap encoding. The fourth encoder 170 encodes the store of unclustered shapes and can utilize lossless bi-level bitmap encoding.

While FIG. 1 is a block diagram illustrating components for the bi-level encoding system 100, it is to be appreciated that the cluster shape estimator 110, the cluster position estimator 120, the bit map estimation from cluster component 130, the first encoder 140, the second encoder 150, the third encoder 160 and/or the fourth encoder 170 can be implemented as one or more computer components, as that term is defined herein. Thus, it is to be appreciated that computer executable components operable to implement the bi-level encoding system 100, the cluster shape estimator 110, the cluster position estimator 120, the bit map estimation from cluster component 130, the first encoder 140, the second encoder 150, the third encoder 160 and/or the fourth encoder 170 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Figure 6:
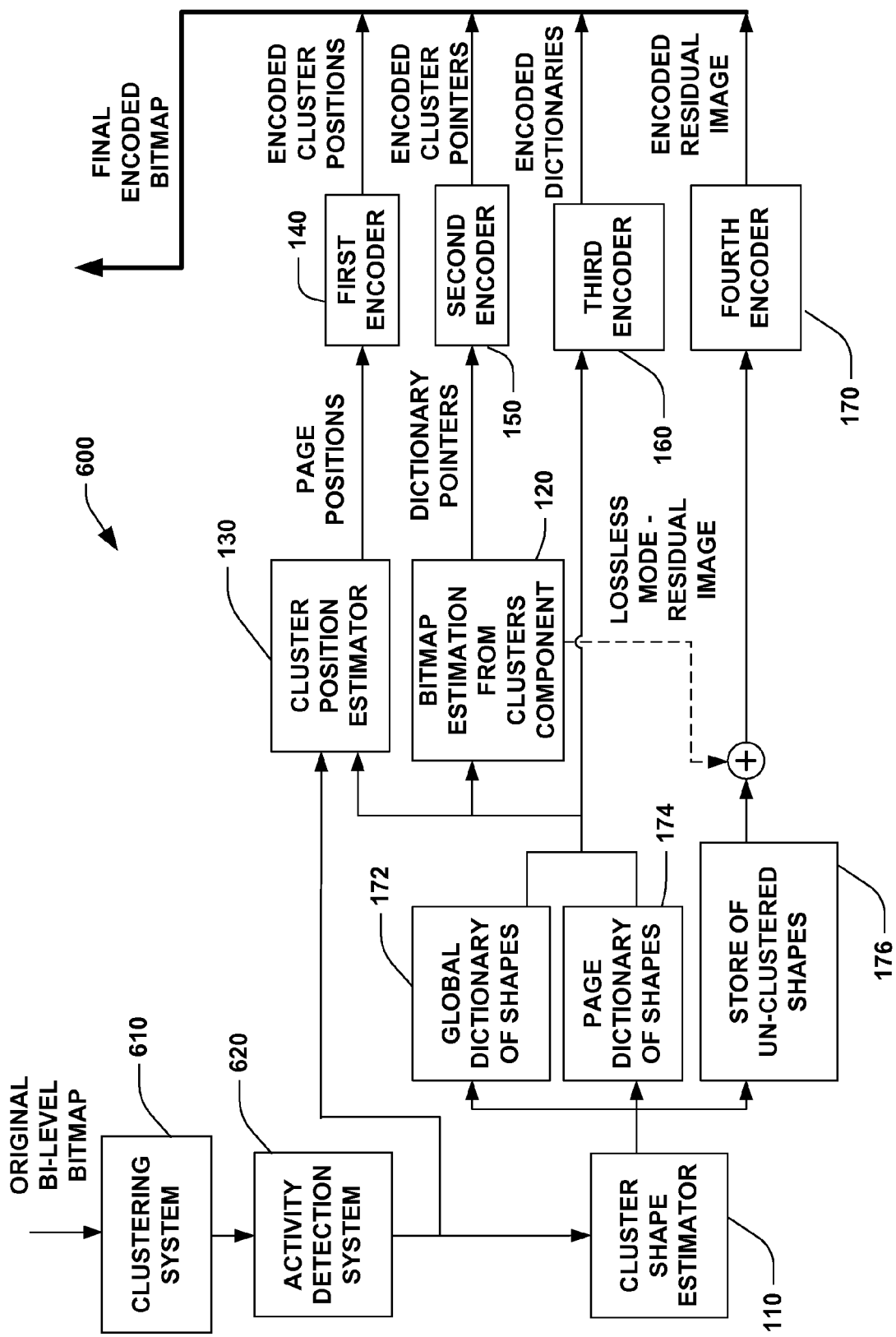
FIG. 6 is a block diagram of a bi-level encoding system in accordance with an aspect of the present invention.

Turning next to FIG. 6, a bi-level encoding system 600 in accordance with an aspect of the present invention is illustrated. The bi-level encoding system 600 includes a cluster shape estimator 110, a bitmap estimation from clusters component 120, a cluster position estimator 130, a first encoder 140, a second encoder 150, a third encoder 160 and a fourth encoder 170. The bi-level encoding system 600 further includes a clustering system 610 and/or an activity detection system 620.

The clustering system 610 identifies information associated with a plurality of clusters (e.g., connected components). For example, the information can include width (e.g., x size), height (e.g., y size), color, horizontal position (e.g., absolute and/or relative) and/or vertical position (e.g., absolute and/or relative) of the plurality of clusters (e.g., connected components).

The activity detection system 620 receives a bi-level image input. For example, bi-level image input can be a binary mask received from a mask separator component (not shown) or a scanned image (e.g., from a document scanner and/or a facsimile machine). The activity detection system 620 analyzes the bi-level image for dithering/half toning and/or noise. The activity detection system 620 provides a bi-level image output based on the bi-level image input; however, with reduced dithering/half toning and/or noise.

Bi-level image(s) based on document image(s) having dithering/half toning typically have a significant quantity of connected component(s) in and/or intersecting the region. Additionally, bi-level image(s) having noise typically have few connected component(s) in and/or intersecting the region. Thus, by determining the quantity of connected component(s) in and/or intersecting the region, the activity detection system 620 can detect areas in which dithering/half toning and/or noise is likely present.

In addition to detecting dithering as discussed above, the activity detection system 620 can further be adapted to detect noise in the bi-level image input. "Noise" refers to extraneous information (e.g., mark(s)) deletion of which will not substantially compromise integrity of the bi-level image. Removal of noise in the bi-level image input can lead to improved data compression resulting from a smoother image. A region of a bi-level image having noise would typically exhibit relatively little connectivity. For example, a region comprising solely a connected stray mark on a white background would have one connected component.

It is to be appreciated that the clustering system 610 and/or the activity detection system 620 can be implemented as one or more computer components, as that term is defined herein.

Figure 7:
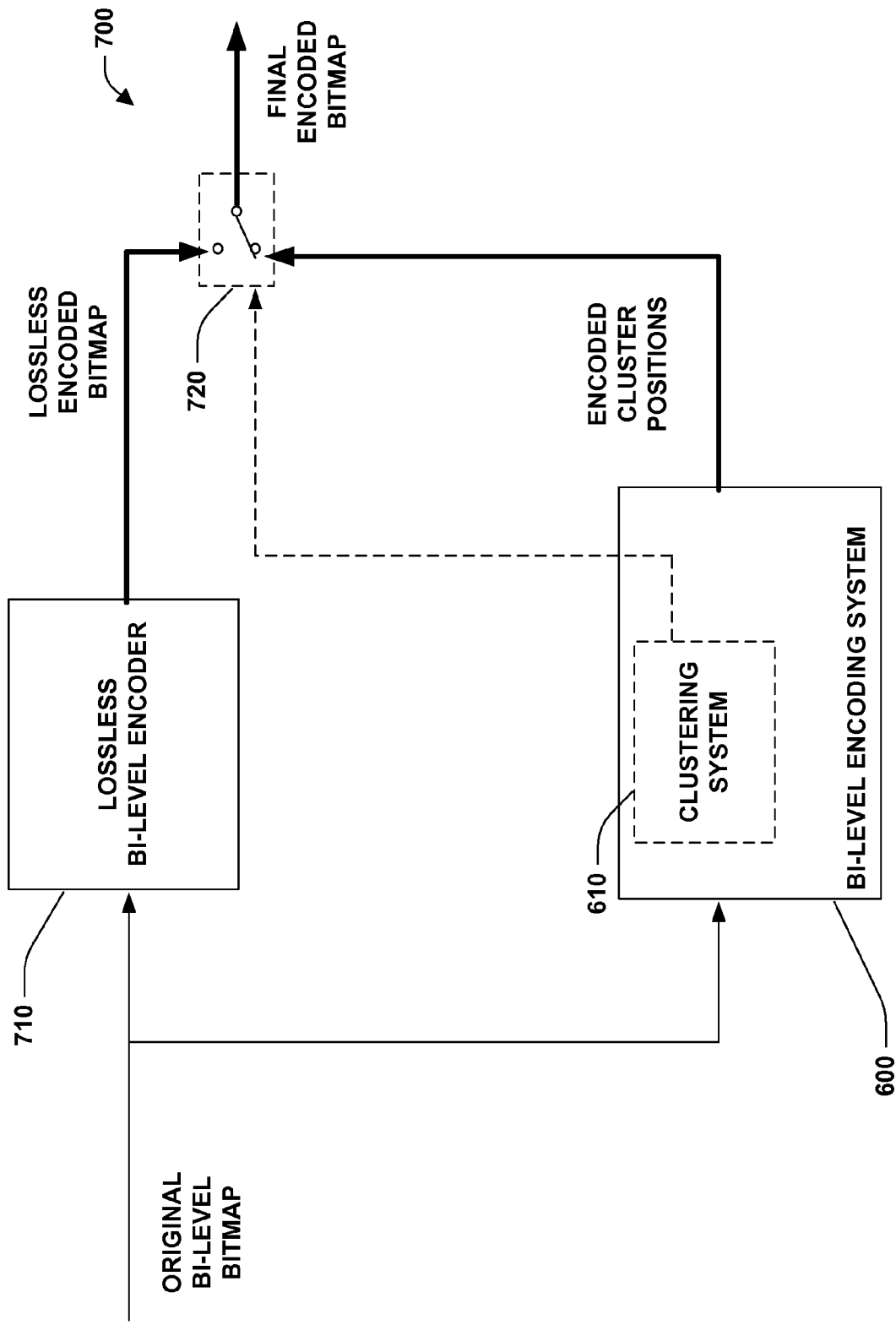
FIG. 7 is a block diagram of a selectable bi-level encoding system in accordance with an aspect of the present invention.

Referring next to FIG. 7, a selectable bi-level encoding system 700 in accordance with an aspect of the present invention is illustrated. The selectable bi-level encoding system 700 includes a bi-level encoding system 600, a lossless bi-level encoder 710 and a selection component 720.

The lossless bi-level encoder 710 can employ lossless bi-level encoding technique(s). For example, the lossless bi-level encoder 710 can utilize an encoding process (BLC) that does not use arithmetic coding, but whose performance is close to that of state-of-the-art coders such as JBIG, JBIG-2, and JB2. In general, the bi-level coder (BLC) uses two context-based adaptive modules: 1) an adaptive predictor controlled by low-resolution probability estimates that is used to map the original pixels explicitly into prediction error pixels, and 2) a backward-adaptive Run-Length-Rice (RLR) coder that encodes the prediction error pixels. That's contrary to the usual approach where the context-dependent probability estimate controls both pixel prediction and adaptive entropy coding. Due to its simplicity, in many applications BLC may be a better choice other current coders.

The bi-level image compression encoding begins with a pixel prediction and prediction error generation procedure. Pixel prediction generally entails predicting the value of a pixel (e.g., either 0 or 1) based on surrounding pixels. More particularly, pixel prediction is accomplished by computing context-dependent probability estimates. A context is essentially a neighborhood of previously encoded pixels forming a pattern referred to as a template. Any standard template can be adopted for the purposes of the present invention. The context can be viewed as vector list of a prescribed number of pixel values in raster order. These values form a binary word that uniquely identifies the context. This binary word is referred to as a context index.

The context-dependent probability estimates are computed by first creating and initializing a pixel probability table. This is accomplished by assigning an initial probability to each of the possible context indexes. Preferably, the initial probability would be 0.5 (i.e., an equal possibility that the pixel associated with the context index is black or white). The probability value is however scaled to prevent any round-off problems between the encoder and decoder. Preferably, the scaling is done by choosing an integer number representing a probability of 100% that a pixel is white. For example, in tested embodiments of the present invention the number "8" was employed. Thus, the scaled probability representing the aforementioned initial value would be "4".

For each pixel in raster order, the context index associated with the pattern of previously encoded pixels is identified and the scaled probability read from the table. If the probability is 0.5 or above (i.e., a scaled probability of 4 or above in the example given above), then the pixel under consideration is predicted to be white and assigned the appropriate binary value (e.g., preferably a "0" pixel value). Note that the first time each context index is encountered, the prediction will always be a white pixel since a scaled probability of 4 was initially assigned to each context index in the table. The scaled prediction value is then adjusted by increasing it by a prescribed amount (e.g., by one) if the pixel just predicted was deemed to be white, or decreasing it by a prescribed amount (e.g., by one) if the pixel was predicted to be black. The results of the scaled probability adjustment operation are truncated to a zero value if it falls below zero, and to the maximum scaled probability value minus one if it falls above that value. Thus, the probabilities will vary depending on the image being encoded and what pixel location is being predicted. This is referred to as backward adaptive pixel prediction, since the decoder can perform the same adjustments to the probability estimates without the need for explicit context probability information to be sent to the decoder.

The prediction error is computed next. Essentially, the prediction error is computed by comparing the predicted pixel value of either black or white for each pixel in the bi-level image to the actual pixel. Then, only data concerning those predictions that are incorrect need be transmitted. In most cases, the prediction will be correct, so a considerable savings in the amount of data can be realized. This works because as will be described later, the decoder performs the same prediction process and will get the same results including the errors. Thus, all the decoder needs to know is which of the predicted pixel values are in error so they can be changed from white to black or black to white, as the case may be, to reconstruct the image. The prediction error is specifically computed using a binary technique such that the actual value of each pixel in the image is compared to its predicted value using exclusive OR logic. Thus, if the actual pixel value matches the predicted value (e.g., both are 0's or both are 1's), then a "0" is assigned to that pixel location as part of a so-called prediction error image. However, if the actual pixel value is different from the predicted value, then a "1" is assigned to the associated pixel location in the prediction error image.

The next phase of the bi-level image encoding involves the use of a context-dependent, backward-adaptive, Run-Length-Rice (RLR) coding procedure. As it has been found that the predicted value will usually match the actual value, the prediction error image is composed mostly of 0's. This makes the prediction error image particularly amenable to further compression, thus allowing even less information to be transmitted. To encode the prediction error image, it is preferred the RLR encoding technique be used. In general a RLR coder is a variable-to-variable length entropy coder in which uninterrupted runs of $2^k$ zeros are represented by a codeword formed by a single "0", and partial runs of r zeros ($r<2^k$) followed by a 1 are represented by a codeword formed by a 1 followed by the k-bit binary word representation of r. The variable k defines the maximum run length of zeros that can occur in the prediction error image before a codeword is transmitted. Adjusting this variable controls the efficiency of the coding operation. The preferred technique is to employ a backwards-adaptive approach for adjusting k. This approach involves choosing an initial value for k and then adjusting it up or down in increments based on whether a "0" codeword is generated or a "1+ k-bit binary word" code is generated. The RLR encoding technique according to the present invention is also made dependent on the previously described contexts. Specifically, an encoding table is established which assigns a k variable to each context index. The encoding table is updated to reflect the changes to the k values that may occur during the encoding of the bi-level image, as will be explained next.

The aforementioned context-dependent, backward adaptive, RLR encoding technique involves first initializing the aforementioned encoding table by setting the k value associated with each context index to a prescribed initial value (e.g., k=2). In addition, a scaled version of the k variable designated as the Rice parameter k' is assigned to each context. For example, a simple scaling factor could be multiplied by the current k value to produce the current k' value, which would be greater than the k value.

When a prediction error value is established for a pixel location, the present RLR coder identifies the context index associated with that pixel location as determined in the prediction error determination process described earlier. The k value currently assigned to that context index is then read from the encoding table. In the case where the pixel location under consideration is the first pixel in raster order in the image (i.e., the upper left hand corner pixel), the associated k value read from the table is used to calculate the run length, where the run length is preferably equal to $2^k$. This run length represents the number of consecutive white pixels in raster order that must exist in order to generate a "0" codeword. When the next prediction error value is computed, it is determined whether it is a "1" or a "0". If it is a "0", then it is determined if this value is in the "middle" of the previously computed run length under consideration or whether it represents the end of this run length. If it does not represent the end of a run, no codeword is generated. If, however, the prediction error value does represent the end of a run, then a "0" codeword is transmitted. Of course in order to know whether an prediction error value represents the end of the current run length, the present RLR coder must keep track of how many "0" have been encountered. This is preferably done by also including run counters in the encoding table. Specifically, a separate run counter would be assigned to each context index. In one embodiment the run counter would initially be set to the computed run length value. Then, each time a "0" is encountered as discussed above, including the first in the series, the counter is decremented by one. When the counter reaches zero, the prediction error value currently being process is deemed to be the end of the current run length. If, on the other hand, a prediction error value of "1" is encounter at any time during a run, then the present RLR coder generates a "1+ k-bit binary word" code where the k-bit binary word represents the number of "0's" encountered in the current run prior to encountering the "1". The number of "0's" encountered can be easily determined using the aforementioned run counter assigned to the context index associated with the pixel location where the run began. Once a codeword has been generated, whether it is a "0" or a "1+ k-bit binary word", the very next prediction error value that is generated is used to start another run. This is accomplished as it was for the first pixel location by identifying the context index associated with the pixel location of the prediction error value and repeating the foregoing process.

In addition, substantially every time a codeword is generated, the k-value associated with the run that resulted in the codeword is adjusted. This is preferably accomplished as follows. If the codeword generated was a "0", then the parameter k' is increased by a prescribed amount. Conversely, if the codeword was not a "0", then the parameter k' is decreased by a prescribed amount. This prescribed amount can vary, if desired, depending on the current value of k'. The new k value is computed by dividing the new k' value by the aforementioned scaling factor. The new value for k' is then stored in the encoding table in place of the previous value. By adjusting k' by integer steps, it is possible to achieve a fine adjustment of the RLR parameter k, which is necessary for optimal encoding performance, while keeping only integer arithmetic, which is necessary to allow the decoder to precisely track the k adjustment steps.

The selection component 720 allows for a selection between lossless bi-level encoding, utilizing the lossless bi-level encoder 710, and the bi-level encoding system (e.g., employing clusters (lossless or lossy)). Selection can be based, for example, upon a user preference and/or by a clustering system 610 within the bi-level encoding system 600. In one example, the clustering system 610 determines that it would be more efficient to proceed with lossless bi-level encoding and provides an output to the selection component 720 facilitating selection of the lossless bi-level encoder 710.

For example, for handwritten notes or other graphics, the clustering system 610 can be determine clustering to be less effective than lossless bi-level encoding (e.g., since there aren't many repeated clusters). According, the selection component 720 allows for utilization of the lossless bi-level encoder 710.

It is to be appreciated that the lossless bi-level encoder 710 and/or the selection component 720 can be implemented as one or more computer components, as that term is defined herein.

Figure 8:
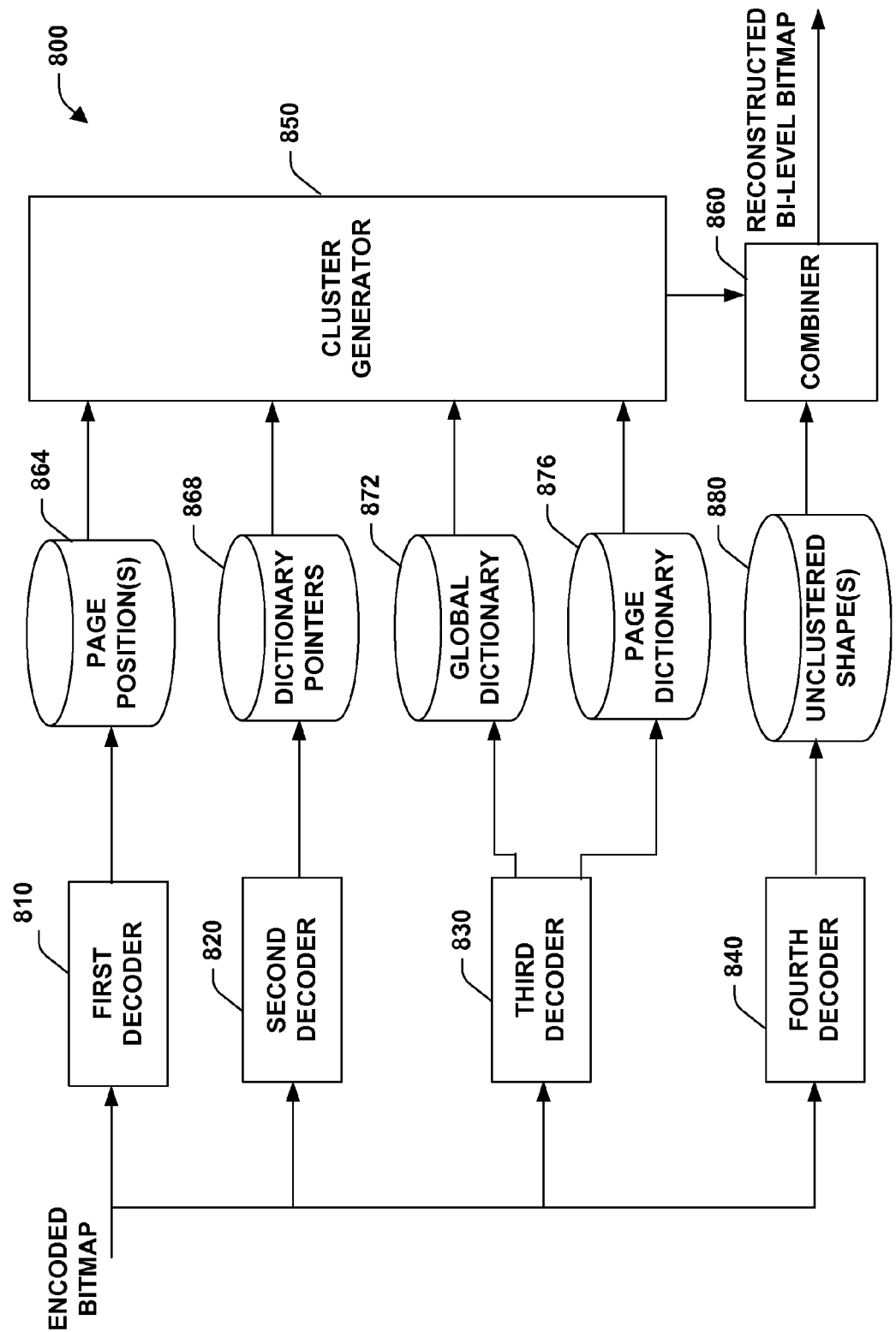
FIG. 8 is a block diagram of a bi-level decoding system in accordance with an aspect of the present invention.

Turning next to FIG. 8, a bi-level decoding system 800 in accordance with an aspect of the present invention is illustrated. The bi-level decoding system 800 includes a first decoder 810, a second decoder 920, a third decoder 830, a fourth decoder 840, a cluster generator 850 and a combiner 860.

The first decoder 810 decodes at least part of a bit stream input (e.g., produced by a corresponding encoder) and provides page position(s) 864 of cluster(s). In one example, the first decoder 810 employs bit-plane decoding.

The second decoder 820 decodes at least part of a bit stream input (e.g., produced by a corresponding encoder) and provides decoded dictionary positions 868. For example, the second decoder 820 can employ LZX decoding.

The third decoder 830 decodes at least part of a bit stream input (e.g., produced by a corresponding encoder) and provides a decoded global dictionary of shapes 872 and/or a decoded page dictionary of shapes 876. For example, the third decoder 830 can employ lossless bi-level decoding.

The fourth decoder 840 decodes at least part of a bit stream input (e.g., produced by a corresponding encoder) and provides a store of unclustered shapes 880. For example, the fourth decoder 840 can employ lossless bi-level decoding.

The cluster generator 850 generates clusters based, at least in part, upon the page positions, dictionary positions and at least one of the global dictionary and page dictionary.

The combiner 860 provides a bi-level output based, at least in part, upon the clusters generated by the cluster generator 850 and/or the store of unclustered shape(s) 880.

In view of the exemplary systems shown and described above, methodologies that may be implemented in accordance with the present invention will be better appreciated with reference to the flow charts of FIGS. 9, 10, 11, 12, 13 and 14. While, for purposes of simplicity of explanation, the methodologies is shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 9:
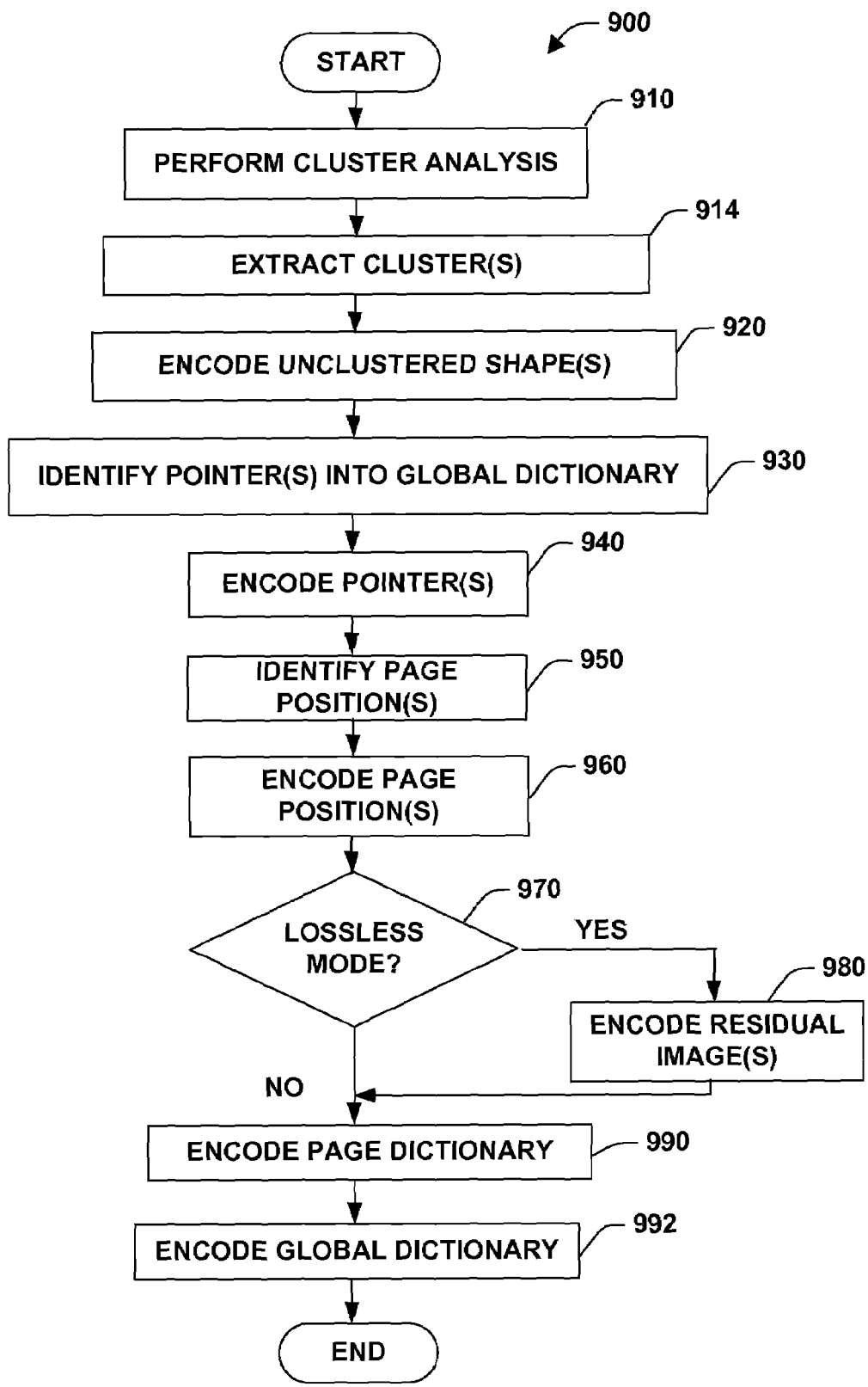
FIG. 9 is a flow chart illustrating a methodology for performing bi-level encoding in accordance with an aspect of the present invention.

Turning to FIG. 9, a method 900 for performing bi-level encoding in accordance with an aspect of the present invention is illustrated. At 910, cluster analysis is performed. For example, connected component information associated with a bitmap can be analyzed (e.g., by a cluster shape estimator 110). The connected component information can include color, horizontal size, vertical size, horizontal position and/or vertical position of the connected components. At 914, cluster(s) are extracted. For example, the extracted cluster(s) can be stored in a global dictionary, a page dictionary and a store of unclustered shapes.

Next, at 920, unclustered shape(s) are encoded. For example, the unclustered shape(s) can include connected component(s) that are either too small (e.g., smaller than a third threshold) or large (e.g., larger than a fourth threshold) to be text characters and therefore do not cluster well. The unclustered shape(s) can be encoded utilizing lossless bi-level encoding.

At 930, pointer(s) into the global dictionary are identified. The pointer(s) can be identified based, at least in part, upon the cluster analysis and/or connected component information. At 940, the pointer(s) are encoded. In one example, because the clusters have been sorted by position on the page, the indices (e.g., pointers) tend to form a text string-like order encoding is performed employing a compression algorithm suitable for text strings (e.g., LZX encoding).

At 950, page position(s) are identified. The page position(s) are for clusters in the global dictionary and/or the page dictionary and can be identified utilizing the connected component information. Thus, for a cluster in the global dictionary and/or the page dictionary, its position on a page is determined utilizing the connected component information and the properties from its dictionary entry from either the global dictionary or the page dictionary. At 960, the page position(s) are encoded, for example, utilizing bit-plane encoding.

At 970, a determination is made as to whether lossless mode is desired. If the determination at 970 is YES, at 980, residual image(s) are encoded and processing continues at 990. If the determination at 970 is NO, processing continues at 990. At 990, the page dictionary is encoded. At 992, the global dictionary is encoded (e.g., utilizing lossless bi-level encoding).

Figure 10:
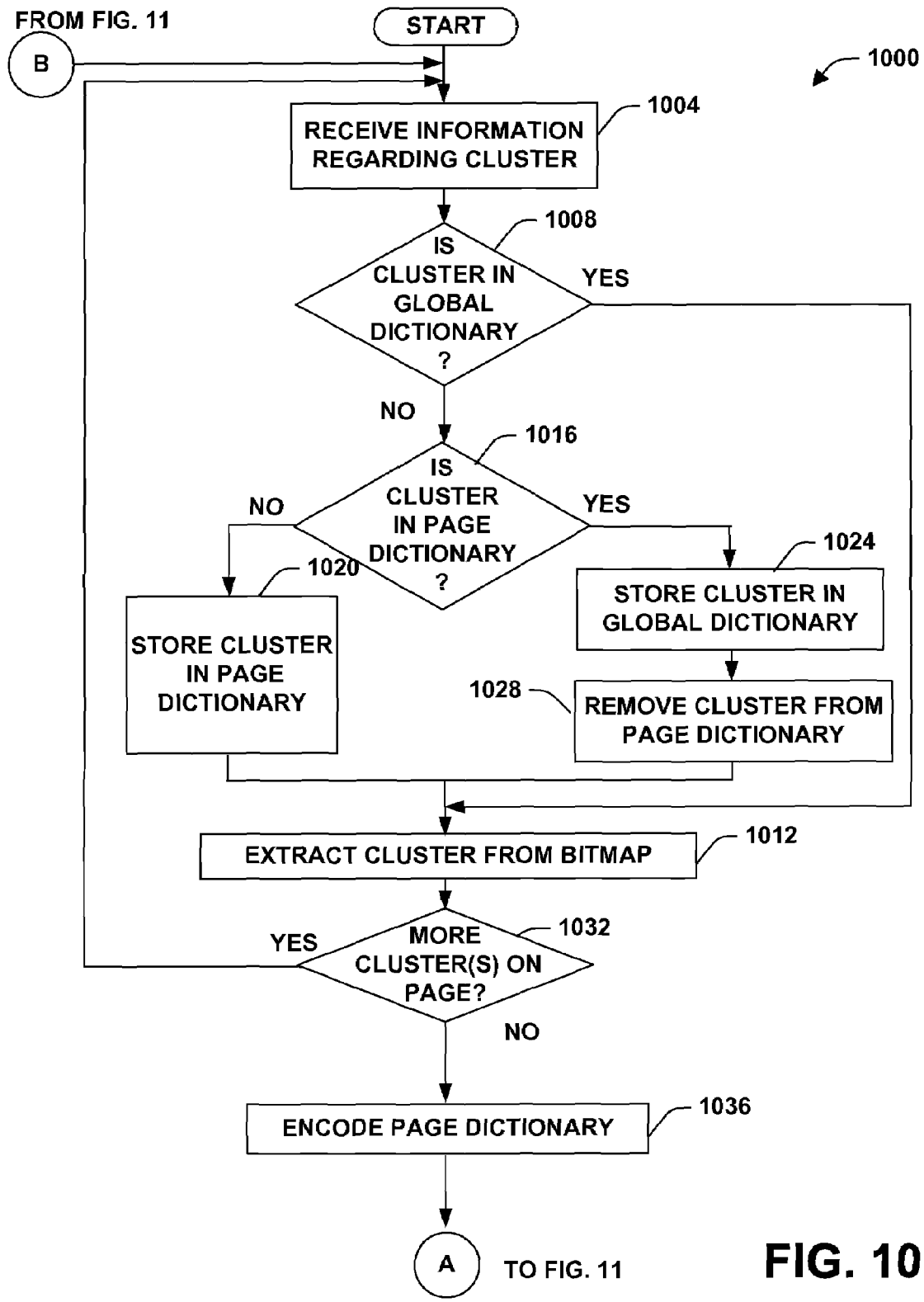
FIG. 10 is a flow chart illustrating a methodology for performing bi-level encoding in accordance with an aspect of the present invention.
Figure 11:
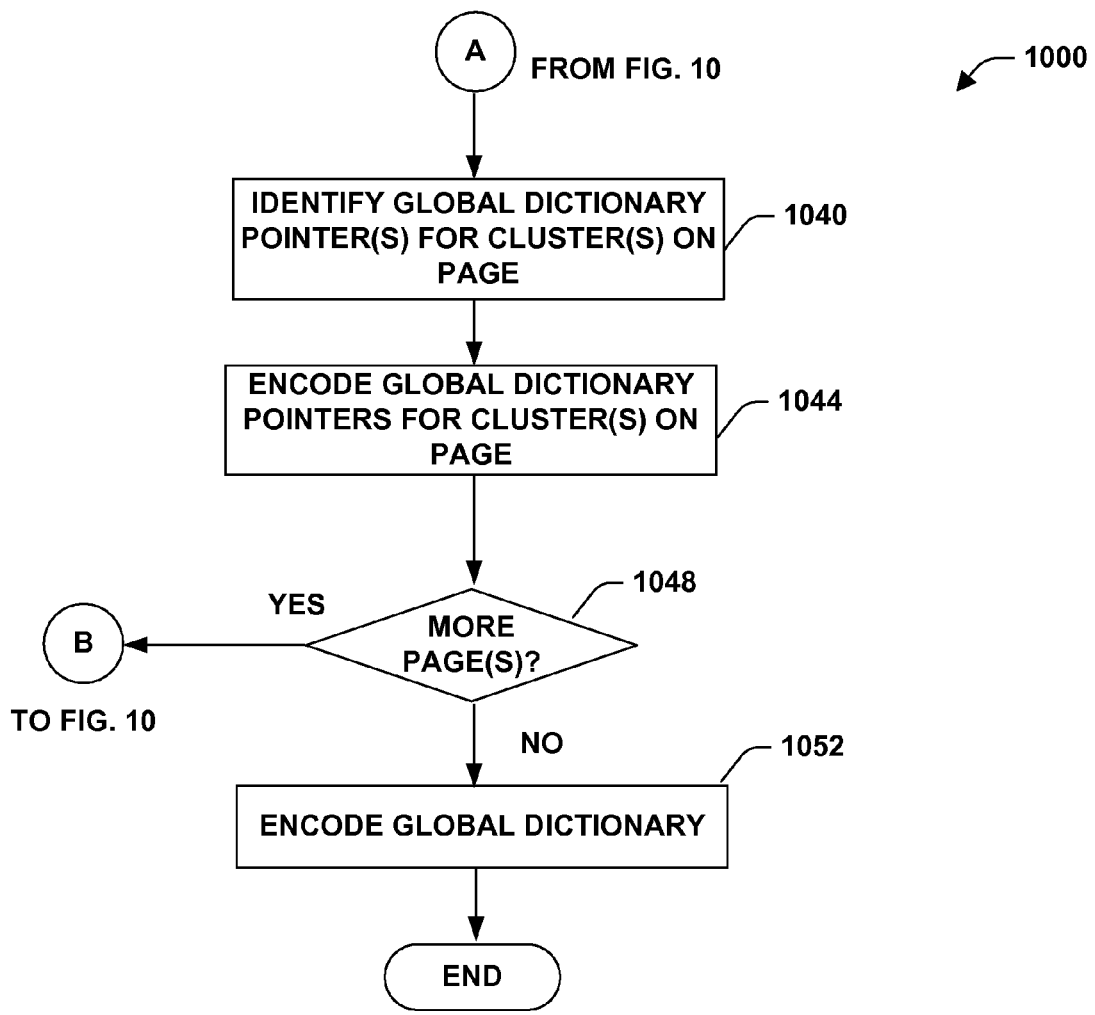
FIG. 11 is a flow chart further illustrating the methodology of FIG. 10.

Referring next to FIGS. 10 and 11, a method 1000 for performing bi-level encoding in accordance with an aspect of the present invention is illustrated. At 1004, information regarding a cluster is received (e.g. color, horizontal size, vertical size, horizontal position and/or vertical position).

At 1008, a determination is made as to whether the cluster is in the global dictionary. For example, in lossless mode, the determination can be based upon whether the cluster is within a first threshold amount of a cluster in the global dictionary. Further, in lossy mode, the determination can be based upon whether the cluster is within a second threshold amount of a cluster in the global dictionary.

If the determination at 1008 is YES, processing continues at 1012. If the determination at 1008 is NO, at 1016, a determination is made as to whether the cluster is in the page dictionary. If the determination at 1016 is NO, at 1020, the cluster is stored in the page dictionary and processing continues at 1012. If the determination at 1016 is YES, at 1024, the cluster is stored in the global dictionary. At 1028, the cluster is removed from the page dictionary and processing continues at 1012.

At 1012, the cluster is extracted from the bitmap. Next, at 1032, a determination is made as to whether there are more cluster(s) on the page. If the determination at 1032 is YES, processing continues at 1004. If the determination 1032 is NO, at 1036, the page dictionary is encoded. At 1040, global dictionary pointer(s) for cluster(s) on the page are identified. At 1044, the global dictionary pointer(s) for cluster(s) on the page are encoded. Next, at 1048, a determination is made as to whether there are more page(s). If the determination at 1040 is YES, processing continues at 1004. If the determination at 1040 is NO, at 1052, the global dictionary is encoded.

Figure 12:
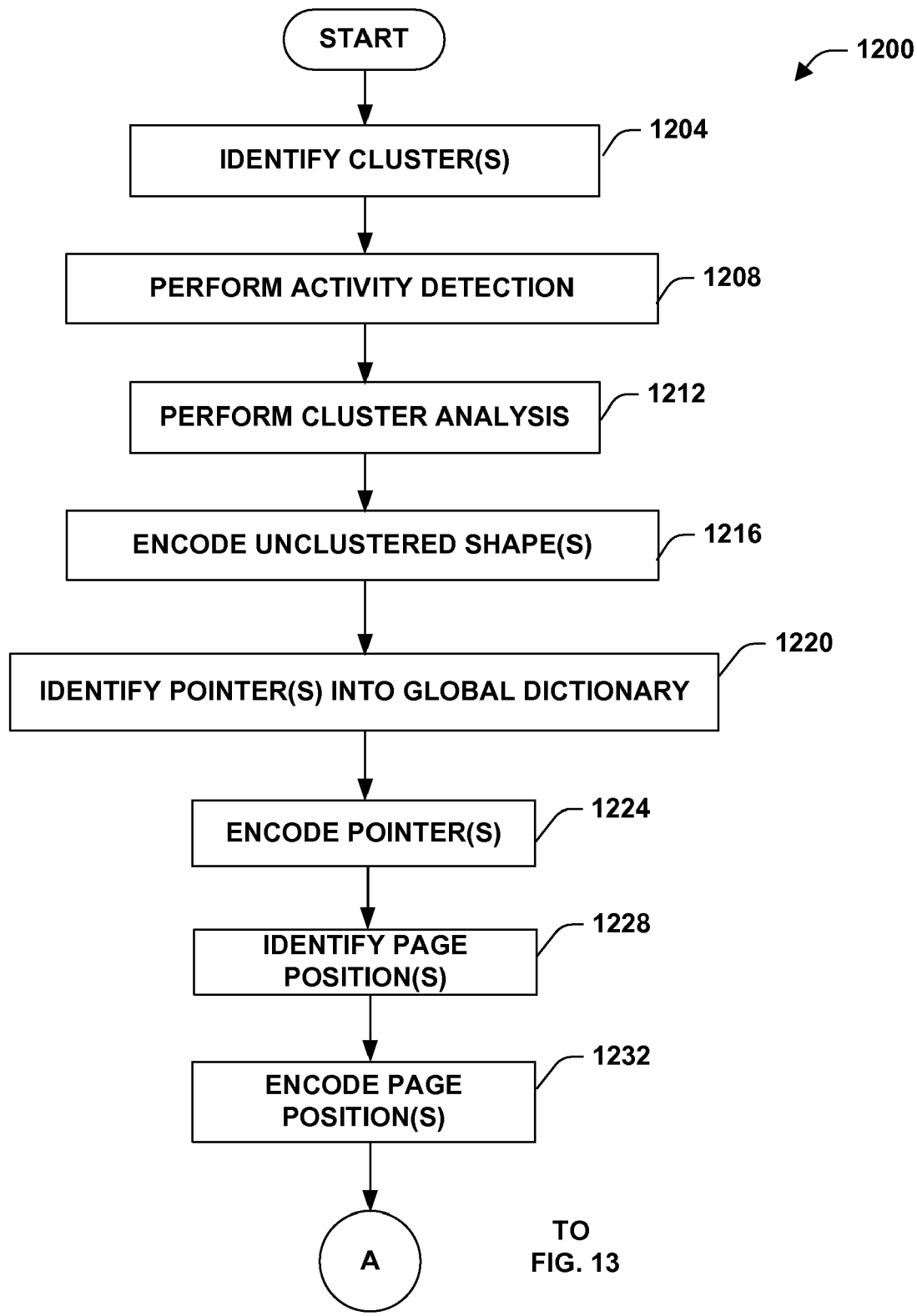
FIG. 12 is a flow chart illustrating a methodology for performing cluster analysis in accordance with an aspect of the present invention.
Figure 13:
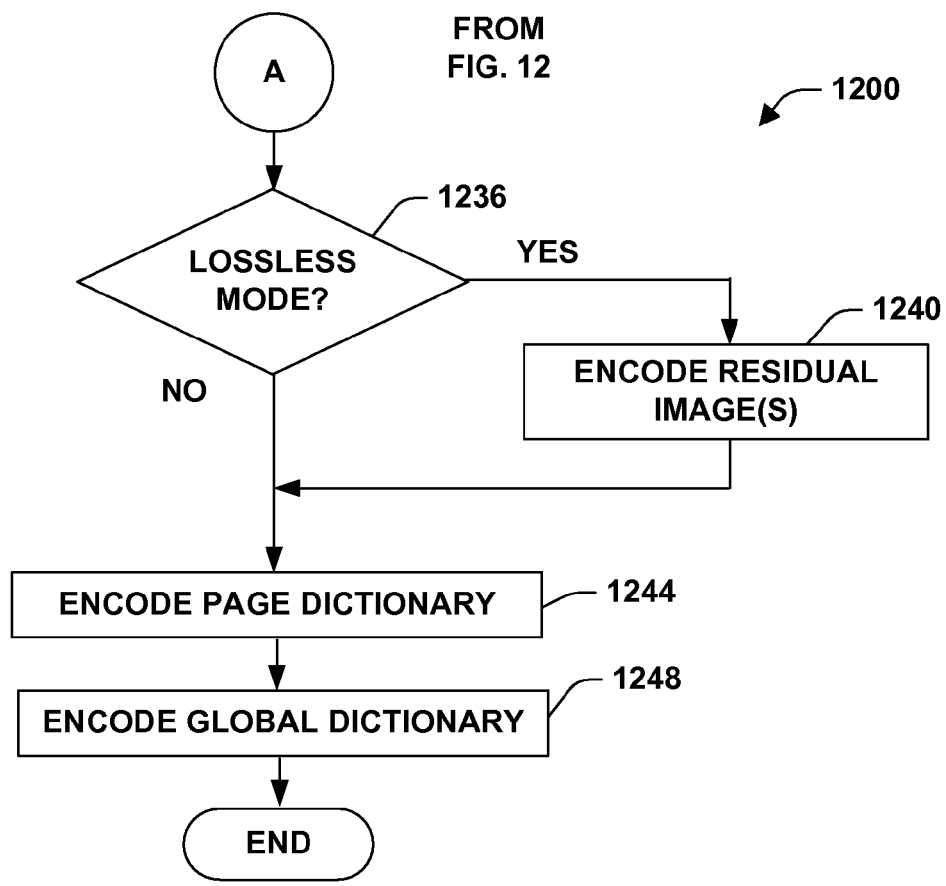
FIG. 13 is a flow chart further illustrating the methodology of FIG. 12.

Turning next to FIGS. 12 and 13, a method 1200 for performing cluster analysis in accordance with an aspect of the present invention is illustrated. At 1204, cluster(s) are identified. At 1208, activity detection is performed. At 1212, cluster analysis is performed. At 1216, unclustered shape(s) are encoded. At 1220, pointer(s) into the global dictionary are identified. At 1224, pointer(s) are encoded. At 1228, page position(s) are identified. At 1232, page position(s) are encoded. At 1236, a determination is made as to whether lossless mode is desired. If the determination at 1236 is YES, at 1240, the residual image(s) are encoded and processing continues at 1244. If the determination at 1236 is NO, processing continues at 1244. At 1244, the page dictionary is encoded. At 1248, the global dictionary is encoded.

Figure 14:
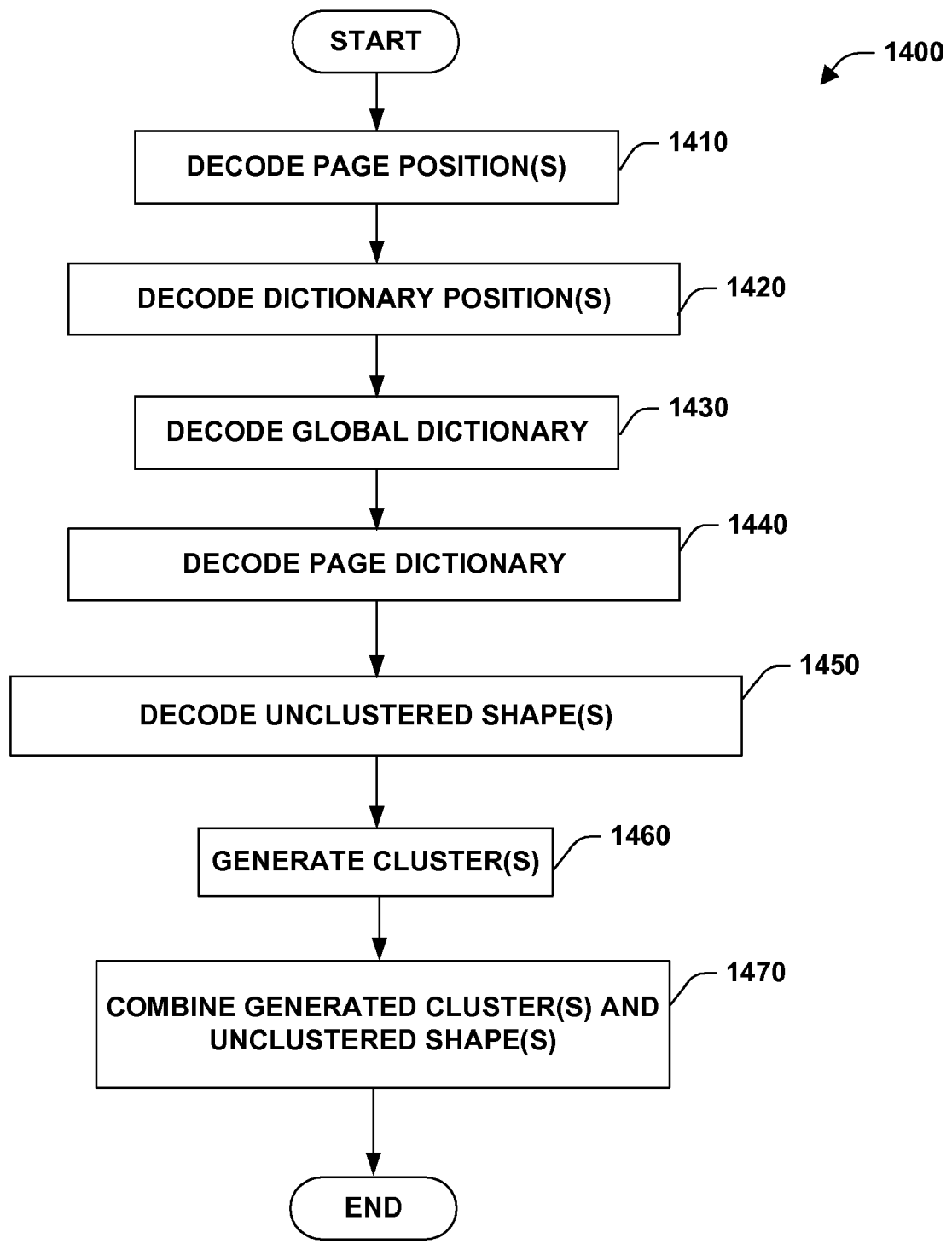
FIG. 14 is a flow chart illustrating a methodology for performing bi-level decoding in accordance with an aspect of the present invention.

Referring to FIG. 14, a method 1400 for performing bi-level decoding in accordance with an aspect of the present invention is illustrated. At 1410, page position(s) are decoded. At 1420, dictionary position(s) are decoded. At 1430, a global dictionary is decoded. At 1440, a page dictionary is decoded. At 1450, unclustered shape(s) are decoded. At 1460, cluster(s) are generated based, at least in part, upon the page position(s), dictionary position(s) and the global dictionary and/or the page dictionary. At 1460, the generated cluster(s) and the unclustered shape(s) are combined, for example, to form a bi-level image.

It is to be appreciated that the system and/or method of the present invention can be utilized in an overall compression system facilitating compression of text, handwriting, drawings, pictures and the like. Further, those skilled in the art will recognize that the system and/or method of the present invention can be employed in a vast array of document image applications, including, but not limited to, tablet personal computers, photocopiers, document scanners, optical character recognition systems, PDAs, fax machines, digital cameras, digital video cameras and/or video games.

Figure 15:
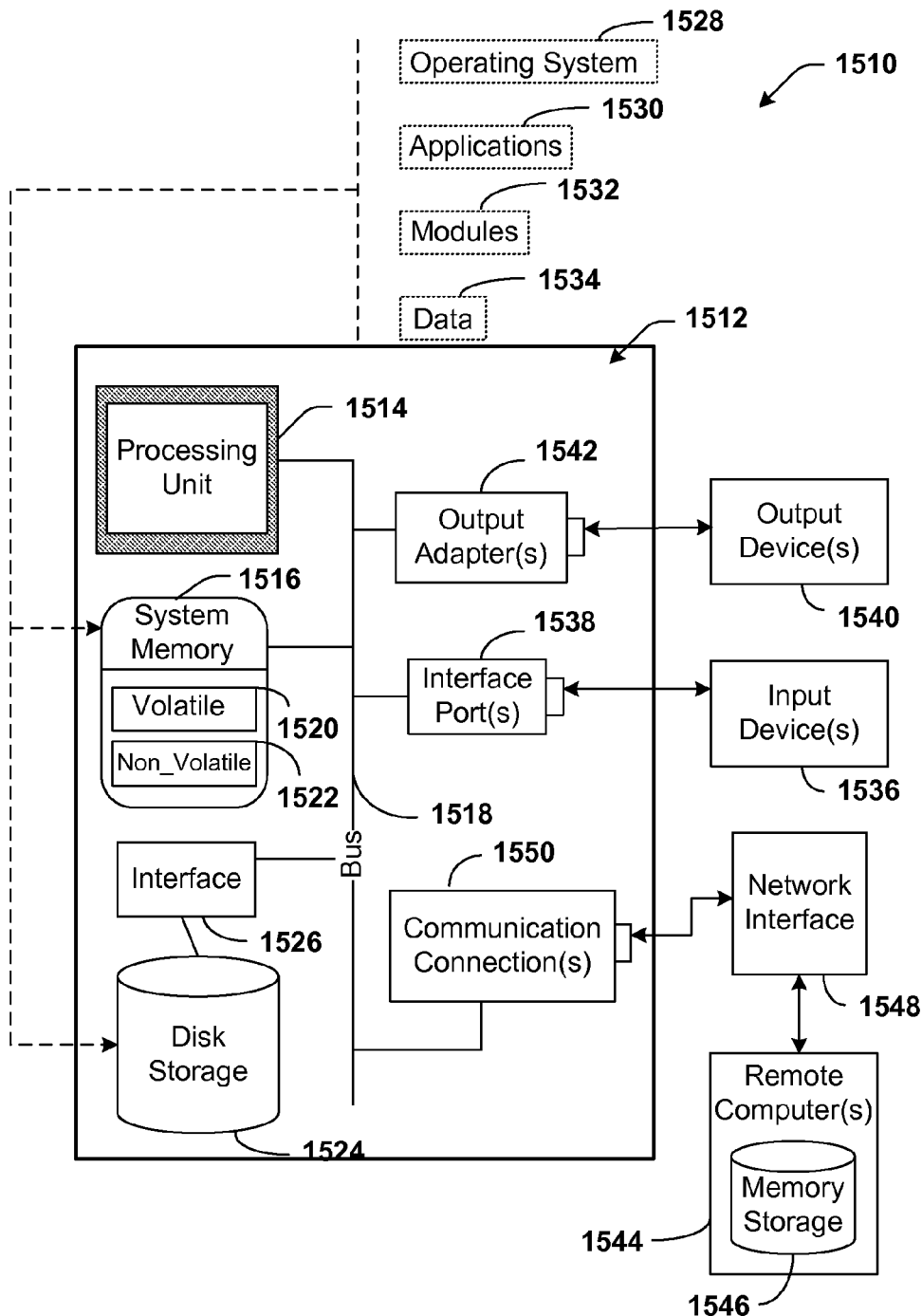
FIG. 15 illustrates an example operating environment in which the present invention may function.

In order to provide additional context for various aspects of the present invention, FIG. 15 and the following discussion are intended to provide a brief, general description of a suitable operating environment 1510 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 1510 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 15, an exemplary environment 1510 for implementing various aspects of the invention includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, 15-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable ROM (EEPROM), or flash memory. Volatile memory 1520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1512 also includes removable/nonremovable, volatile/nonvolatile computer storage media. FIG. 15 illustrates, for example a disk storage 1524. Disk storage 1524 includes, but is not limited to, devices like a magnetic disk drive, floppy disk drive, tape drive, Jazz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used such as interface 1526.

It is to be appreciated that FIG. 15 describes software that acts as an intermediary between users and the basic computer resources described in suitable operating environment 1510. Such software includes an operating system 1528. Operating system 1528, which can be stored on disk storage 1524, acts to control and allocate resources of the computer system 1512. System applications 1530 take advantage of the management of resources by operating system 1528 through program modules 1532 and program data 1534 stored either in system memory 1516 or on disk storage 1524. It is to be appreciated that the present invention can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the possessing unit 1516 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512, and to output information from computer 1512 to an output device 1540. Output adapter 1542 is provided to illustrate that there are some output devices 1540 like monitors, speakers, and printers among other output devices 1540 that require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses communication networks such as local-area networks (LAN) and wide-area networks (WAN). LAN technologies include Fiber Distributed Data Interface (FDDI), Copper Distributed Data Interface (CDDI), Ethernet/IEEE 1502.3, Token Ring/IEEE 1502.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/ software necessary for connection to the network interface 1548 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A bi-level decoding system, comprising:
   a first decoder that decodes at least part of a bit stream, the first decoder decoding page positions;
   a second decoder that decodes at least part of the bit stream, the second decoder decoding dictionary positions;
   a third decoder that decodes at least part of the bit stream, the third decoder decoding a global dictionary of shapes and a page dictionary of shapes;
   a fourth decoder that decodes at least part of the bit stream, the fourth decoder decoding a store of unclustered shapes;
   a cluster generator that generates clusters based, at least in part, upon the page positions, dictionary positions and at least one of the global dictionary and page dictionary; and,
   a combiner that provides a bi-level output based, at least in part, upon the generated clusters and the store of unclustered shapes.

2. The bi-level decoding system of claim 1, the first decoder employing, at least in part, upon bit-plane decoding.

3. The bi-level decoding system of claim 1, the second decoder employing, at least in part, upon LZX decoding.

4. The bi-level decoding system of claim 1, the third decoder employing, at least in part, upon lossless bi-level decoding.

5. The bi-level decoding system of claim 1, the fourth decoder employing, at least in part, upon a lossless bi-level decoding.

6. A method for bi-level decoding, comprising:
   decoding a page position;
   decoding a dictionary position;
   decoding a global dictionary; and,
   generating a cluster based, at least in part, upon the page position, the dictionary position and the global dictionary to provide a bi-level output.

7. The method of claim 6, further comprising at least one of the following acts:
   decoding a page dictionary;
   decoding an unclustered shape;
   combining the cluster and the unclustered shape to provide the bi-level output.

8. A computer readable medium storing computer executable components of a system for bi-level decoding, comprising:
   a first decoder that decodes at least part of a bit stream, the first decoder decoding page positions;
   a second decoder that decodes at least part of the bit stream, the second decoder decoding dictionary positions;

a third decoder that decodes at least part of the bit stream, the third decoder decoding a global dictionary of shapes and a page dictionary of shapes;

a fourth decoder that decodes at least part of the bit stream, the fourth decoder decoding a store of unclustered shapes;

a cluster generator that generates clusters based, at least in part, upon the page positions, dictionary positions and at least one of the global dictionary and page dictionary; and, a combiner that provides a bi-level output based, at least in part, upon the generated clusters and the store of unclustered shapes.

9. A bi-level decoding system, comprising:

means for decoding page positions;

means for decoding dictionary positions;

means for decoding at least one of global dictionary of shapes and a page dictionary of shapes;

means for decoding a store of unclustered shapes;

means for generating a cluster based, at least in part, upon the page positions, dictionary positions and at least one of the global dictionary and page dictionary; and, means for combining the generated clusters and the store of unclustered shapes to provide a bi-level output.

* * * * *